United States Patent
Opshaug et al.

(10) Patent No.: US 9,510,268 B2
(45) Date of Patent: Nov. 29, 2016

(54) EARLY ARRIVAL PATH DETECTION

(71) Applicant: QUALCOMM Incorporated, San Diego, CA (US)

(72) Inventors: Guttorm Opshaug, Redwood City, CA (US); Weihua Gao, San Jose, CA (US); Mayur Shah, Millcreek, WA (US); Arash Mirbagheri, San Diego, CA (US); Borislav Ristic, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 200 days.

(21) Appl. No.: 14/605,688

(22) Filed: Jan. 26, 2015

(65) Prior Publication Data

US 2015/0237565 A1    Aug. 20, 2015

Related U.S. Application Data

(60) Provisional application No. 61/940,316, filed on Feb. 14, 2014.

(51) Int. Cl.
*H04W 72/04* (2009.01)
*H04W 40/24* (2009.01)

(52) U.S. Cl.
CPC ................. *H04W 40/246* (2013.01)

(58) Field of Classification Search
CPC .... H04W 72/04; H04W 88/08; H04W 76/00
See application file for complete search history.

(56) References Cited

U.S. PATENT DOCUMENTS

| | | |
|---|---|---|
| 2010/0061478 A1 | 3/2010 | Liu et al. |
| 2011/0286349 A1 | 11/2011 | Tee et al. |
| 2013/0023285 A1 | 1/2013 | Markhovsky et al. |
| 2013/0120188 A1 | 5/2013 | Pattabiraman et al. |

OTHER PUBLICATIONS

Huang M., et al., "Enhanced LTE TOA/OTDOA Estimation with First Arriving Path Detection," IEEE Wireless Communications and Networking Conference (WCNC), 2013, pp. 3992-3997.

*Primary Examiner* — Hassan Phillips
*Assistant Examiner* — Prenell Jones
(74) *Attorney, Agent, or Firm* — Kilpatrick Townsend & Stockton, LLP (57) ABSTRACT

Determining the early arrival path (EAP) based on a channel energy response (CER) can involve the use one or more masks to identify one or more peaks in the CER. Masks can be applied to the CER in an iterative process that can help identify the earliest peak corresponding to the EAP. Alias cancelation may also be implemented.

20 Claims, 7 Drawing Sheets

Scatter Plot of Correlation Peaks Used to Create Masks

EARLY ARRIVAL PATH DETECTION

This application claims the benefit of U.S. Provisional Patent Application Ser. No. 61/940,316, entitled "SYSTEMS AND METHODS FOR EARLY ARRIVAL PATH DETECTION," filed on Feb. 14, 2014, which is assigned to the assignee hereof and incorporated herein by reference for all purposes.

BACKGROUND

In wireless communications, the same Radio Frequency (RF) signal may take multiple paths from a signal source to a receiving antenna. Determination of the Earliest Arrival Path (EAP), or the most direct signal, is an important function for wireless communications. It can be used, for example, in Observed Time Difference Of Arrival (OTDOA) positioning, a cellular network positioning technique that is utilized in wireless standards, such as Long-Term Evolution (LTE). Current techniques of determining EAP, however, often fail to accurately identify the EAP.

SUMMARY

Techniques described herein provide for the determination of the early arrival path (EAP) by comparing a channel energy response (CER) with one or more masks to identify one or more peaks in the CER. Masks can be applied to the CER in an iterative process that can help identify the earliest peak corresponding to the EAP.

An example method of determining an early arrival path of a wireless signal at a device, according to the disclosure, comprises capturing a channel energy response at the device, and identifying a first peak in the channel energy response where the first identified peak comprising a maximum value of a first portion of the channel energy response. The method further comprises positioning and scaling a mask with the first identified peak, comparing at least a portion of the channel energy response with the mask as positioned and scaled with the first identified peak, and determining an earliest arrival path based, at least in part, on the comparison of the at least the portion of the channel energy response with the mask as positioned and scaled with the first identified peak.

The example method may comprise one or more of the following features. The method may comprise (i) identifying, based on the comparison of the at least the portion of the channel energy response with the mask, a next peak, the next identified peak comprising a maximum value of a next portion of the channel energy response, wherein the next identified peak occurs at an earlier time than an earlier identified peak and rises above the mask as positioned and scaled with the earlier identified peak, (ii) positioning and scaling the mask with the next identified peak, and (iii) comparing at least a portion of the channel energy response with the mask as positioned and scaled with the next identified peak. Determining the earliest arrival path may be further based on the comparison of the at least the portion of the channel energy response with the mask as positioned and scaled with the next identified peak. The earlier identified peak may comprise the first identified peak. The method may further comprise repeating (i), (ii), and (iii) until no additional peaks rise above the mask as positioned and scaled with the most recently-identified peak. The method may comprise identifying a noise threshold, and comparing at least a portion of the channel energy response with the noise threshold, wherein determining the earliest arrival path is further based on the comparison of the at least the portion of the channel energy response with the noise threshold. The method may comprise determining an expected aliased term, and adjusting at least a portion of the noise threshold based on the determined expected alias term. The method may comprise selecting the mask from a plurality of masks based on one or more characteristics of the channel energy response. The one or more characteristics of the channel energy response may include a power level of a portion of the channel energy response. The mask may be derived from an auto-correlation function of at least one signal.

An example mobile device, according to the disclosure, may comprise a memory, a wireless communication interface configured to capture a channel energy response, and a processing unit communicatively coupled to the memory and the wireless communication interface, where the processing unit is be configured to identify a first peak in the channel energy response, the first identified peak comprising a maximum value of a first portion of the channel energy response, position and scale a mask with the first identified peak, compare at least a portion of the channel energy response with the mask as positioned and scaled with the first identified peak, and determine an earliest arrival path based, at least in part, on the comparison of the at least the portion of the channel energy response with the mask as positioned and scaled with the first identified peak.

The example mobile device may comprise one or more of the following features. the processing unit may be further configured to (i) identify, based on the comparison of the at least the portion of the channel energy response with the mask, a next peak, wherein the next identified peak comprises a maximum value of a next portion of the channel energy response and occurs at an earlier time than an earlier identified peak and rises above the mask as positioned and scaled with the earlier identified peak, (ii) position and scale the mask with the next identified peak; and (iii) compare at least a portion of the channel energy response with the mask as positioned and scaled with the next identified peak, wherein determining the earliest arrival path is further based on the comparison of the at least the portion of the channel energy response with the mask as positioned and scaled with the next identified peak. The processing unit may be further configured to repeat (i), (ii), and (iii) until no additional peaks rise above the mask as positioned and scaled with the most recently-identified peak. The processing unit may be further configured to identify a noise threshold, and compare at least a portion of the channel energy response with the noise threshold, wherein determining the earliest arrival path is further based on the comparison of the at least the portion of the channel energy response with the noise threshold. The processing unit may be further configured to determine an expected aliased term, and adjust at least a portion of the noise threshold based on the determined expected alias term. The processing unit may be further configured to select the mask from a plurality of masks based on one or more characteristics of the channel energy response. The one or more characteristics of the channel energy response may include a power level of a portion of the channel energy response.

An example apparatus, according to the description, comprises means for capturing a channel energy response, and means for identifying a first peak in the channel energy response, the first identified peak comprising a maximum value of a first portion of the channel energy response. The example apparatus further comprises means for positioning and scaling a mask with the first identified peak, means for comparing at least a portion of the channel energy response with the mask as positioned and scaled with the first identified peak, and means for determining an earliest arrival path based, at least in part, on the comparison of the at least the portion of the channel energy response with the mask as positioned and scaled with the first identified peak.

The example apparatus may comprise one or more of the following features. The apparatus may comprise comprising means for (i) identifying, based on the comparison of the at least the portion of the channel energy response with the mask, a next peak, the next identified peak comprising a maximum value of a next portion of the channel energy response, wherein the next identified peak occurs at an earlier time than an earlier identified peak and rises above the mask as positioned and scaled with the earlier identified peak, (ii) positioning and scaling the mask with the next identified peak, and (iii) comparing at least a portion of the channel energy response with the mask as positioned and scaled with the next identified peak, wherein determining the earliest arrival path is further based on the comparison of the at least the portion of the channel energy response with the mask as positioned and scaled with the next identified peak. The means for performing (i), (ii), and (iii) may be configured to repeat (i), (ii), and (iii) until no additional peaks rise above the mask as positioned and scaled with the most recently-identified peak. The apparatus may comprise means for identifying a noise threshold, and means for comparing at least a portion of the channel energy response with the noise threshold, wherein determining the earliest arrival path is further based on the comparison of the at least the portion of the channel energy response with the noise threshold.

DETAILED DESCRIPTION

The ensuing description provides embodiment(s) only, and is not intended to limit the scope, applicability or configuration of the disclosure. Rather, the ensuing description of the embodiment(s) will provide those skilled in the art with an enabling description for implementing an embodiment. It is understood that various changes may be made in the function and arrangement of elements without departing from the spirit and scope of this disclosure.

A wireless wide area network (WWAN), such as a cellular network, can utilize mobile telecommunication cellular network technology to enable electronic devices such as mobile phones, tablets, and/or other mobile wireless devices to transmit and receive data over a large geographical region, using antennas (e.g., cell towers or base stations). Because the antennas can be linked to a certain geographic areas, they can be utilized to enable positioning of a mobile device. Such positioning may be used, for example, as a complement and/or alternative to other positioning technologies (e.g., Satellite Positioning System (SPS)).

The positioning of a mobile device using antennas such as cell towers or base stations may be based on measurements that are indicative of the distance between the mobile device and antennas. Such measurements may involve a determination of the Earliest Arrival Path (EAP), or the most direct Radio Frequency (RF) signal, between the antenna and the mobile device. The EAP can then be used to determine the Time Of Arrival (TOA) between the antenna and the mobile device, which can be the basis for positioning determinations. For example, the TOA is the basis for the Long-Term Evolution (LTE) standard Observed Time Difference Of Arrival (OTDOA) calculation. The TOA may additionally or alternatively be the basis for a variety of other positioning calculations involving tri- and/or multi-lateration, hyperbolic navigation, and the like. Embodiments described herein relate to techniques for improved early arrival path (EAP) detection. It can be noted that, although embodiment describe utilizing the channel energy response vector from an LTE OTDOA short search, and generating a mask based on the dedicated positioning reference signal (PRS) used for EAP detection, embodiments are not so limited. Techniques provided herein can be applied to other wireless communication standards and/or methods.

Figure 1:
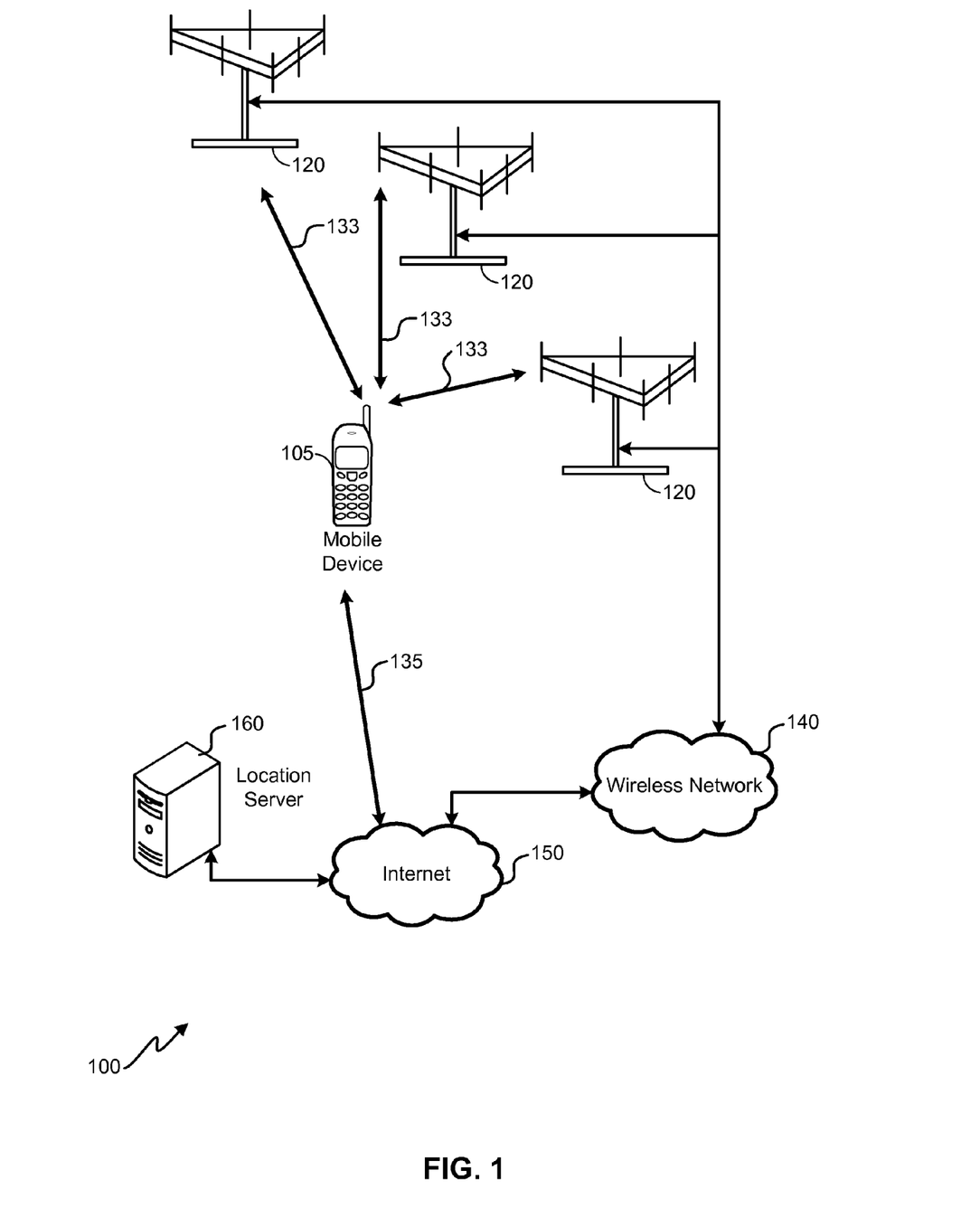
FIG. 1 is a simplified illustration of an embodiment of a wireless wide area network capable of implementing techniques for determining EAP described herein.

FIG. 1 is a simplified illustration of a WWAN 100 capable of implementing these techniques, according to one embodiment. The WWAN 100 can include at least one mobile device 105, wireless network 140, antennas 120, location server 160, and the Internet 150. It should be noted that FIG. 1 provides only a generalized illustration of various components, any or all of which may be utilized as appropriate, and each of which may be duplicated as necessary. Specifically, although only one mobile device 105 is illustrated, it will be understood that many mobile devices (e.g., hundreds, thousands, millions, etc.) may be utilized in the WWAN 100. Similarly, WWAN 100 may include many more antennas 120 than the three shown in FIG. 1. Even so, some embodiments may have fewer antennas 120. Furthermore, components may be rearranged, combined, separated, substituted, and/or omitted, depending on desired functionality. A person of ordinary skill in the art will recognize many modifications to the components illustrated.

Broadly speaking, the mobile device 105 and/or antenna(s) 120 can be used to determine a position of the mobile device 105 by, for example, calculating a TOA (and thereby a distance) between the mobile device 105 and antenna(s) 120, by determining the EAP using the techniques described below. According to some embodiments, measurements taken to determine the position of the mobile device (such as TOA) can then be provided to a location server 160 for computation of a location estimate of the mobile device 105 by the location server 160. Additionally or alternatively, the mobile device 105 and/or other device can make a computation of its estimated location based on location measurements.

Antennas 120 are communicatively coupled to the wireless network 140 (e.g., a cellular network), which may be communicatively coupled with the Internet 150. The location server 160 can also be communicatively coupled with the Internet 150. Thus, the mobile device 105 can communicate location measurements and/or estimated location to the location server 160 via the Internet 150 and/or other data communication network via a first communication link 133 to one or more antennas 120 and/or by accessing the Internet via a second communication link 135 (e.g., via a local wireless network).

As previously indicated, location measurements can include the determination of an OTDOA and/or other calculations based on the observed TOA of RF signals between one or more antennas 120 and the mobile device 105. For example, a first antenna 120 may transmit an RF signal to the mobile device 105 for determination of a TOA. The resulting Channel Energy Response (CER) (also referred to herein as the CER vector) detected by the mobile device 105 will have a peak corresponding to the transmitted RF signal. Problematically, however, the CER can have multiple peaks due to multipath, noise, and/or other causes. Thus, the peak corresponding to the most direct path (EAP) must be identified in order to determine the TOA.

Peaks can be defined as high points in the CER vector. In some embodiments, there may be specific qualifications. In some embodiments, for example, a peak is defined as a point (or sample) in the CER vector with an amplitude higher than the two previous neighboring points and also higher than the one neighboring point that immediately follows. It can be noted that the largest peak of the CER vector does not necessarily indicate the shortest path. For example, an RF signal pathway around a building may result in a stronger signal than an RF signal pathway through a building, although the pathway through the building is more direct. Thus, the determination of the EAP can be difficult. Embodiments of the present invention can utilize a mask to help determine EAP.

Figure 2:
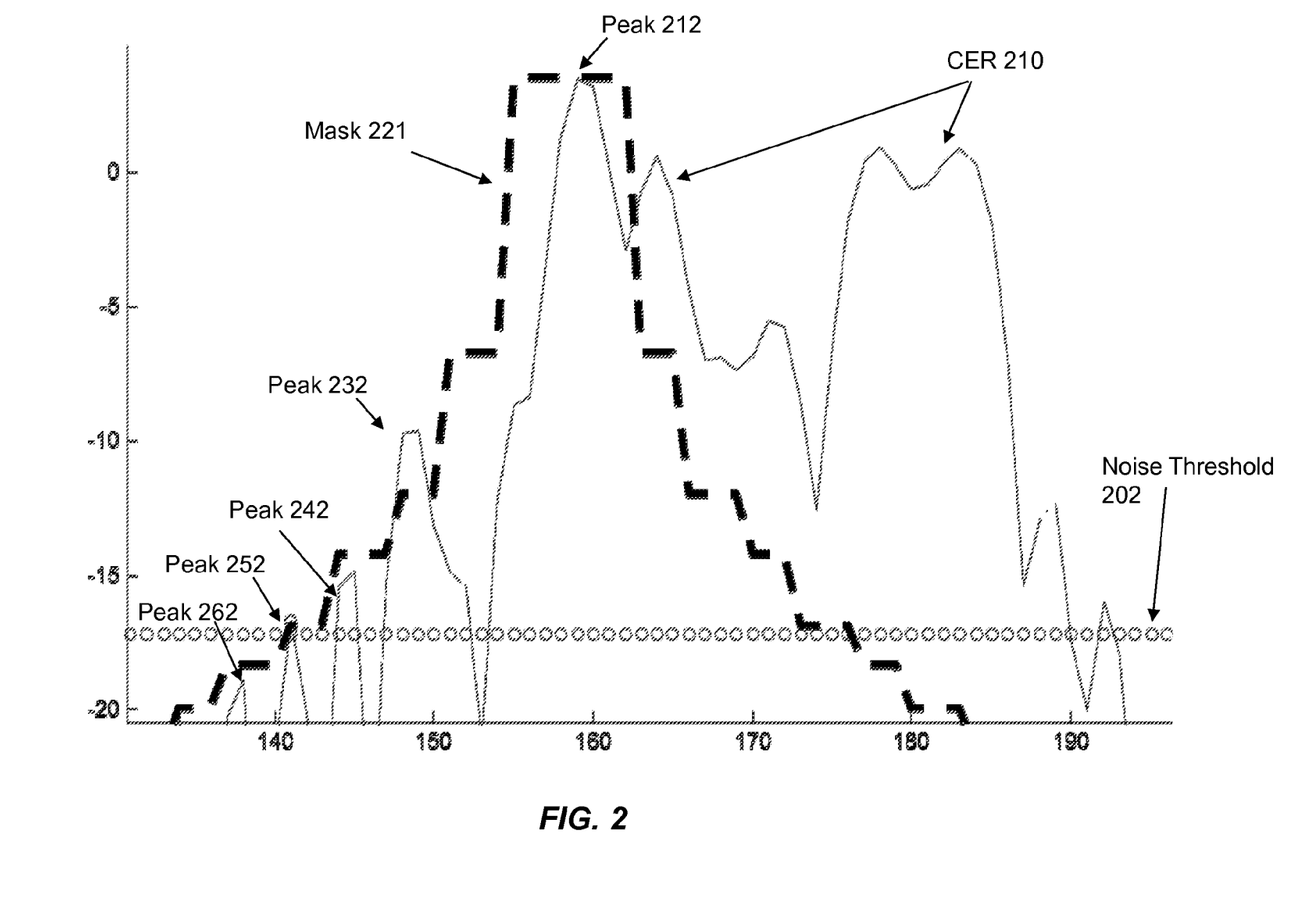
FIGS. 2-3 are graphs of a CER that help illustrate an embodiment of how a mask can be used to determine EAP.
Figure 3:
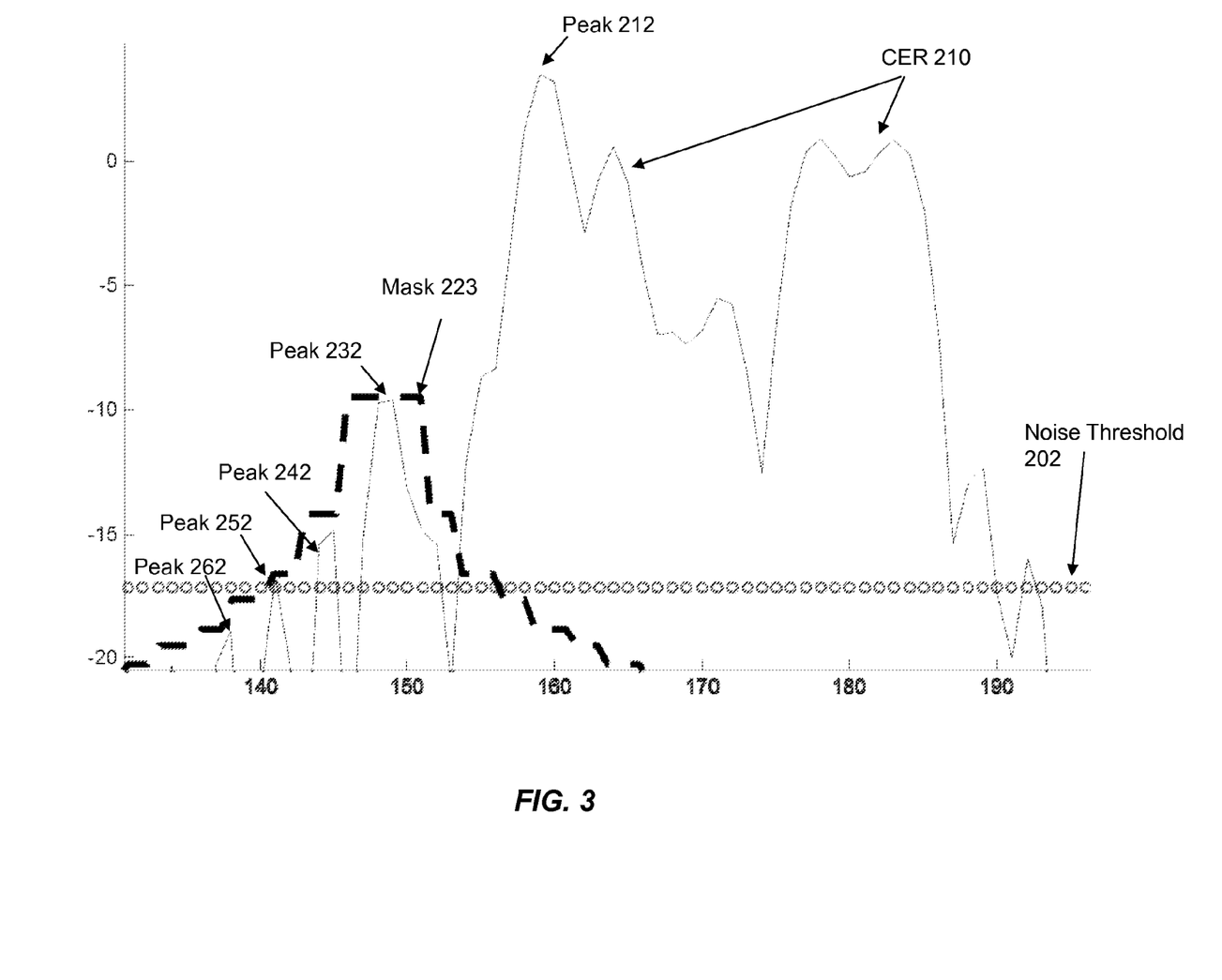

FIGS. 2 and 3 are graphs that help illustrate how one or more masks may be used to determine an EAP, according to one embodiment. The graphs show the amplitude of an example CER 210 in the time domain, as received, for example, by a mobile device 105. The graphs in FIGS. 2 and 3 were derived from an embodiment in which a fixed sample rate of 30.72 MHz (a 32.6 ns sample length) was used to capture 2048 samples over a span of approximately 66.7 μs, equivalent to the duration of the non-CP portion of an LTE symbol. (In this embodiment, the number 2048 corresponds to the case of 20 MHz system bandwidth which renders a fast Fourier transform (FFT) order of 2048 the most efficient implementation. Other embodiments may use any Discrete Fourier Transform size. The actual start of search window and its length can be determined by the OTDOA assistance data that is furnished to a user equipment (UE) (e.g., a mobile device) by the network informing it of the list of neighbor cells to be measured and the approximate a priori information expected for the TOA of each cell.) It can be noted that although this embodiments describes a CER having a length of 2048 samples, other embodiments may include CERs having more or fewer samples, and this may be set by e.g. OTDOA assistance data. Depending on desired functionality, embodiments may involve fixed or variable sampling rates higher and/or lower than the 30.72 MHz rate of this example, with signals higher and/or lower than the effective signal bandwidth of 18 MHz. Various embodiments may function under different device operation assumptions. A person of ordinary skill in the art will recognize that embodiments may employ a variety of alterations to the example shown.

Once the CER is obtained, candidate peaks for the EAP can be identified. As shown, the CER 210 of FIG. 2 has several peaks 212, 232, 242, 252, 262. Determining candidate peaks may first involve eliminating peaks that do not rise above a noise threshold 202. The noise threshold 202 may be established to eliminate peaks that may be attributable to noise.

The noise threshold 202 may be established in any manner of ways. In some embodiments, a noise floor can be identified, and a noise threshold can be established based on the identified noise floor. For example, the embodiment shown in FIGS. 2 and 3 has a noise floor (not shown) of approximately −30 dB. In one embodiment, the noise threshold 202 is established at 13.5 dB above the noise floor, or approximately at −16.5 dB in the plot. Depending on desired functionality, embodiments may employ a noise threshold 202 higher or lower than the 13.5 dB in the illustrated example. Some embodiments may employ a variable noise floor and/or noise threshold 202, for increased or decreased sensitivity. Other embodiments may adjust the noise floor for alias term cancelation, as described herein below. A person of ordinary skill in the art will recognize many alternative embodiments.

In one embodiment, the noise floor is estimated by dividing the CER vector into a number of equal length sub-sections and finding the median value of each sub-section. All medians are then averaged to generate the final noise floor estimate. If the length of the vector is shorter than the sub-section length, then the process of estimating the noise floor can involve returning the median of the entire vector. For example, where CER_Vector is the CER vector, the noise floor estimate can be calculated as follows:

$$N_{power} = \frac{\sum_{i=0}^{9} median(CER\_Vector(i \cdot k : (i+1) \cdot k - 1))}{10} \quad (1)$$

Where k is the length of a sub-section, for example 256 taps.

Once the noise floor is established, it can be used to create the noise threshold 202, which can be used to eliminate peaks likely due to noise. In the example illustrated in FIG. 2, peak 262 can be eliminated from candidate peaks for EAP because it does not rise above the noise threshold 202.

According to some embodiments, the strongest peak 212 of the peaks 212, 232, 242, 252 above the noise threshold 202 is identified. A mask 221 is then centered and scaled on the strongest peak 212. The properties of the mask 221 reflect the signal properties, thereby enabling techniques provided herein to be more effective at identifying the peak corresponding to the EAP than traditional methods.

The mask 221 can comprise correlation mask, which may be one of a plurality of a pre-generated correlation masks. (Details regarding mask selection are provided below.) These masks may, for example, be based on the 504 unique correlation peaks that are defined by the LTE wireless standard.

Figure 4:
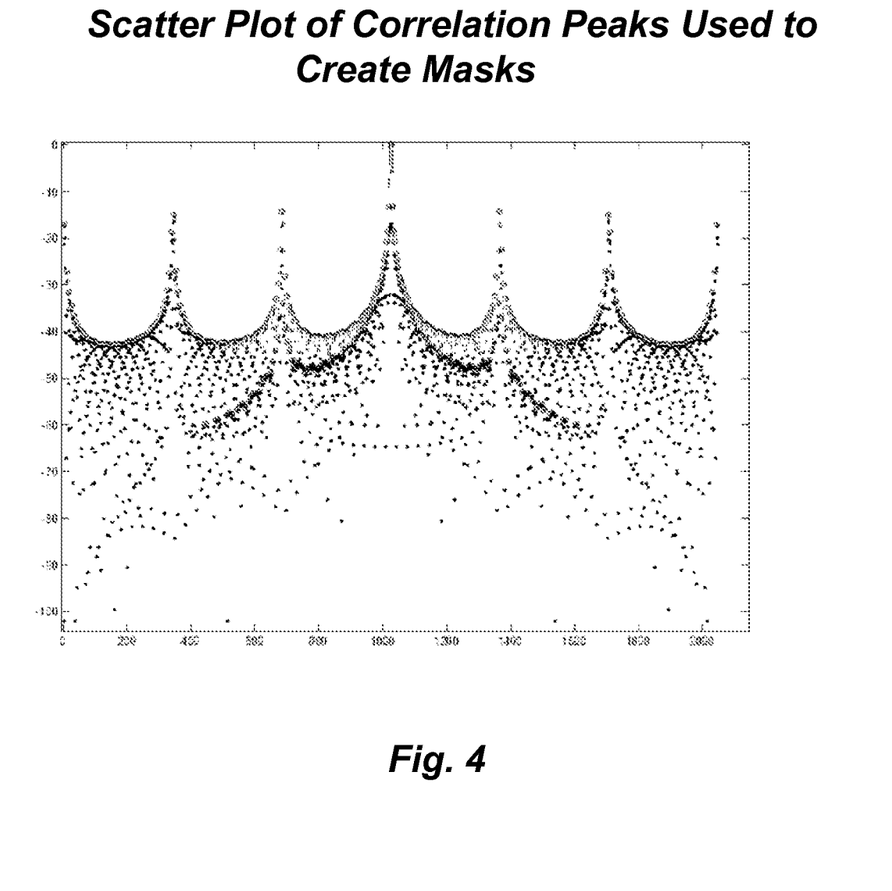
FIG. 4 is a scatter plot of correlation peaks that can be used to create a mask, according to an embodiment.

FIG. 4 shows aspects of one potential mask that may be used according to the embodiments described herein. In particular, FIG. 4 shows a scatter plot of 5040 correlation plots associated with the LTE standard over 2048 samples (or "taps"). The upper envelope of the scatter plot may be used to define the mask, which, in this example, is centered at the largest peak (at approximately sample 1024). It is the center portion of the mask that is shifted and scaled as described herein and shown in FIGS. 2 and 3, so as to be aligned with a candidate peak. It can be noted that, because the mask in this example is 2048 samples long, only a small portion of the mask 221 is illustrated in FIGS. 2 and 3. The positioning reference signals (PRS) used to create the scatter plot of FIG. 4 are described in Chapter 6.10.4 "Positioning reference signals" of the LTE standard (European Telecommunications Standards Institute (ETSI) Telecommunications Standards (TS) 136 211 V10.0.0 2011-01 "LTE; Evolved Universal Terrestrial Radio Access; Physical channels and modulation", which is hereby incorporated by reference for all purposes. The reference signal may, for example, be generated based on physical cell identifier (PCI) [0,503], slot number [0,19], cyclic prefix [0,1] and a number of transmission bandwidth (BW) options of {6,15,25,50,75,100} RBs. That said, there are 504 PCI options, 20 slot-options, 2 Cyclic Prefix (CP) options, 6 BW options and 2 antenna options in the LTE standard. Various combinations may be selected for masks in different embodiments. For example, one embodiment may choose CP=1, a BW option of 50 (i.e. 10 MHz) and a "one-or-two physical broadcast channel (PBCH) antenna" option which are typically deployed in LTE. Certain embodiments may also only consider the 10 even slot numbers since they align with LTE sub-frames.

Thus, in certain embodiments, 504 PCI options, multiplied by 10 slot options, multiplied by 1 CP option, multiplied by 1 BW option, multiplied by 1 antenna option, equals 5040 total PRS signals used for the mask. For each of the PRSs, a system may generate the signal in frequency domain. This response element can then be multiplied by its complex conjugate (i.e., correlation in frequency domain). The resulting elements for all PRS signals can then be combined in one frequency vector. The inverse fast Fourier transform (IFFT) function can then be taken on the frequency vector, and the square of the IFFT vector can generate the auto-correlation function in power scale in time domain in order to create a mask as shown in FIG. 4. Ultimately, it is a knowledge of the properties of the expected signal that can be used to create a mask to effectively identify EAP.

Additionally or alternatively, embodiments may involve generating one mask for each PRS combination. This would ensure that each PRS had its optimal mask. Such embodiments would, however, involve added processing to making each mask, as well as added storage/memory to store each mask. Still, such embodiments are feasible. In still other embodiments, various numbers and types of masks may be used to create trade-offs between mask optimization and resource usage.

Referring again to FIG. 2, once the mask 221 is applied to the CER 210 the mask 221 is compared with CER to identify peaks in the CER that are above the mask. In this manner, the mask 221 acts as an additional threshold for identifying the earliest peak. In various embodiments, the mask may be matched to peaks of the channel energy response in various ways, including offset and slope adjustments to compensate for various known system characteristics. For example, in cases where non-linear phase filters are employed in the Tx-Rx chain, this can lead to an imbalance in the early vs. the late side-lobe levels around the main correlation peak. If such an impairment is known, the mask can be adjusted with increased offsets for the early side-lobe region. As previously indicated, the mask 221 in the embodiment shown in FIG. 2 is first applied to the CER 210 by adjusting the center peak of the mask (in both time and amplitude) to be centered at the identified largest peak 212.

Peaks in the CER that occur prior to the largest peak 212 which are also above the mask 221 are then identified. In FIG. 2, the earlier peaks correspond to peaks to the left of peak 212. Here, peak 232 is clearly an earlier peak above the mask 221 in FIG. 2. The remaining peaks 242 and 252 are either at or below the mask 221. The mask is then reapplied to the earliest identified peak above the mask 221. Here, because peak 232 is the only identified peak above the mask 221, the mask is then reapplied to CER 210, now centered on peak 232. If there are no earlier peaks above the mask 221, then the overall highest peak is selected as the peak corresponding to the EAP.

FIG. 3 illustrates the reapplication of the mask 223 to the CER 210. Just as the mask 221 of FIG. 2 was shifted and scaled to be centered at peak 212, the mask 223 of FIG. 3 is shifted and scaled to be centered at peak 232. To be clear, in this example, mask 223 of FIG. 3 is the same as mask 221 of FIG. 2, but shifted and scaled to peak 232. In FIG. 2 and FIG. 3, Peak 212 has a power level of 3 dB and an offset of 160 taps while Peak 232 has power level −9.5 dB and offset 149 taps. Thus, the original mask around Peak 212 has been shifted left by 160−149=11 taps and attenuated by 3−(−9.5) =12.5 dB to fit around Peak 232. Again, earlier peaks that are above the mask 223 are identified, and the process of reapplying the mask to the CER 210 and identifying earlier peaks continues until no earlier peaks are identified above the mask. In FIG. 3, earlier peaks (peaks 242 and 252) do not rise above the mask. Thus, peak 232 is selected as the peak corresponding to the EAP. The TOA measurement is then based on the time at which peak 232 occurs.

Figure 5:
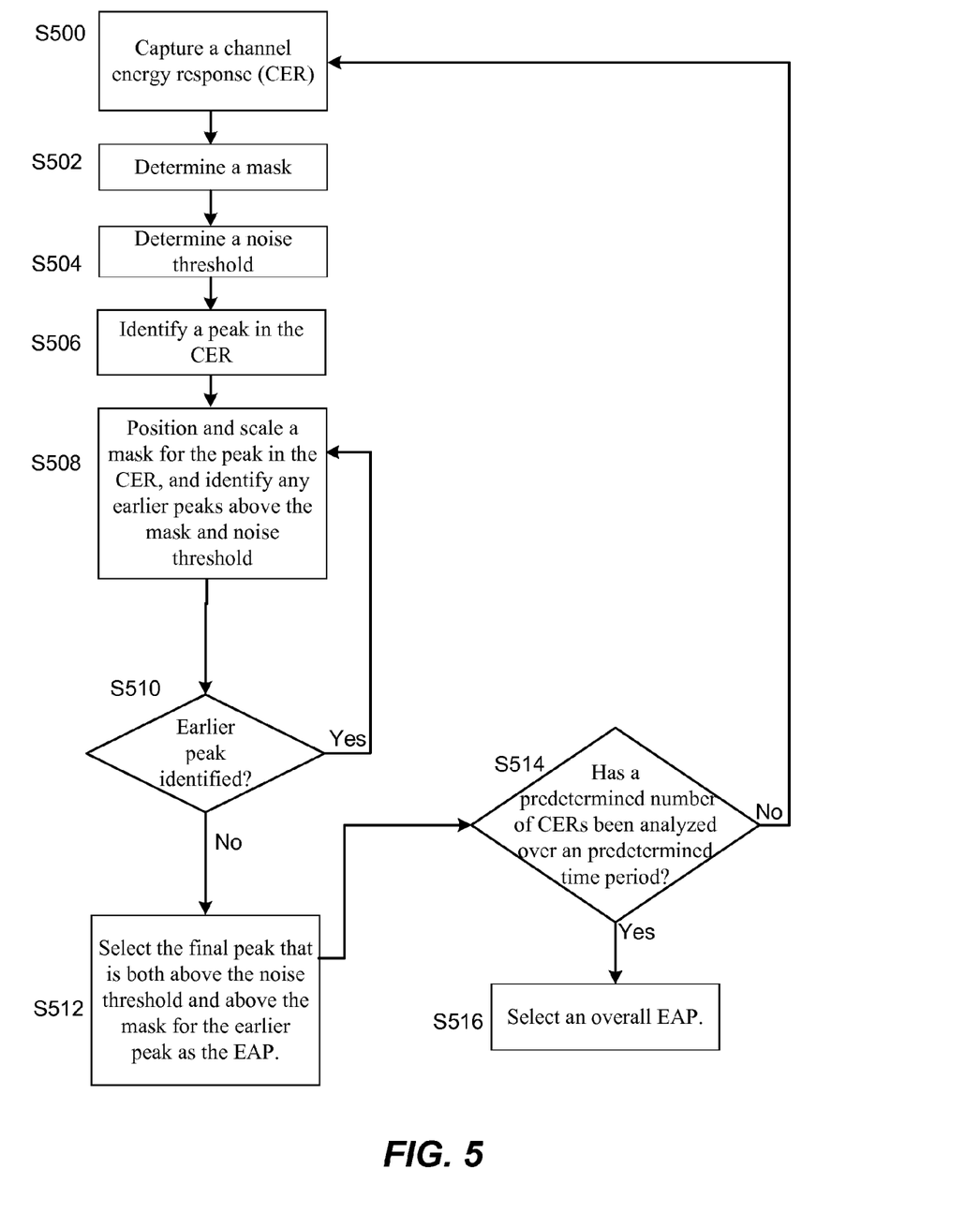
FIG. 5 is flow diagram that illustrates a method for determining an EAP for a device, according to one embodiment.

FIG. 5 is flow diagram that illustrates a method for determining an EAP for a device, according to one embodiment. More specifically, the method shows how a mask as shown in FIGS. 2 and 3 can be used in a method for EAP detection. As described in further detail below, means for performing one or more of the functions of the blocks shown can include one or more hardware and/or software components of a mobile device or other computing device.

Some or all of the functions shown in FIG. 5 may be executed after an early arrival path determination is initiated for a particular device. In some embodiments, the determination of an EAP may be part of a particular wireless standard and/or protocol. Additionally or alternatively, the determination of an EAP may be triggered by an event. In some instances, for example, the determination of an EAP may be initiated by a cellular network. In some instances, the determination of an EAP may be initiated by a mobile device.

At block S500, a channel energy response (CER), such as CER 210 of FIGS. 2 and 3, is captured. The CER can be captured, for example, using an antenna of a mobile device. Means for performing the functionality of S500 can include hardware and/or software components of a mobile device, such as the processing unit(s) 610, DSP 620, wireless communication interface 630, antenna 632, bus 605, memory 660, and/or other components of the mobile device 105 illustrated in FIG. 6.

At block S502 a mask associated with the early arrival path identification, such as mask 221 of FIG. 2, is determined. As indicated elsewhere herein, the mask can be an envelope of a scatter plot of correlation peaks, which enables embodiments to leverage knowledge of an RF signal structure to create a mask that is more accurate at EAP determination. As described in further detail below, a determination of a mask can involve determining which mask, of a plurality of available masks, to use. Also, at block S504, a noise threshold, such as noise threshold 202 of FIGS. 2 and 3, is also determined. The noise threshold and/or mask may be based on any of a variety of factors, such as device settings, user selections, characteristics of the CER, or any combination of these and/or other factors. Means for performing the functionality of S502 and/or S504 can include hardware and/or software components of a mobile device, such as the processing unit(s) 610, DSP 620, bus 605, memory 660, and/or other components of the mobile device 105 illustrated in FIG. 6.

Some embodiments may utilize a single mask. Other embodiments may utilize a plurality of masks, such that a mask may be selected from a plurality of predefined masks, based on characteristics of the received signal.

In one embodiment, two different versions of the correlation peak mask are used to avoid false positives at the leading edge of the signal. Each of the two masks is derived from the envelope of the correlation peaks shown in FIG. 4 (which is a scatterplot of ideal/theoretical conditions), but with different dB offsets to compensate for different real-word conditions. The mask with the higher dB offset is thereby less sensitive to noise, and the mask with the lower dB offset is more sensitive to noise. Thus, the less-sensitive mask can be applied when noise above a certain threshold is detected, and the more-sensitive mask can be applied when the detected noise is below the certain threshold.

Determining levels of noise can be done in any of a variety of ways. In some embodiments, for example, the measured power (e.g., median value) of a window of samples before the maximum peak in the CER can be compared with the expected power (e.g., the power of the corresponding window of samples in the mask). Continuing with the embodiment above, if a ratio of the measured power to the expected power exceeds a certain threshold, then the less-sensitive mask can be applied. On the other hand, if the ratio of the measured power to the expected power is less than the certain threshold, then the more-sensitive mask can be applied.

At block S506, a peak in the CER is identified. In some embodiments, the initially-identified peak is the absolute peak (maximum) in the CER. In FIGS. 2 and 3, for example, the initially-identified (absolute) peak in the channel energy response would be peak 212. Means for performing the functionality of S506 can include hardware and/or software components of a mobile device, such as the processing unit(s) 610, wireless communication interface 630, bus 605, memory 660, and/or other components of the mobile device 105 illustrated in FIG. 6.

At block S508, the mask is positioned (e.g., time shifted) and scaled to match the peak in the CER identified at block S506. As previously shown in FIG. 2, for example, the center of the mask 221 is placed at peak 212 and scaled to match the magnitude of peak 212. In various embodiments, the mask may be matched to peaks of the CER in various ways. As described above, for example, offset and slope adjustments to compensate for various known system characteristics.

Optionally, measures can be taken to cancel out aliased terms that may occur in the received signal. As shown in FIG. 4, in addition to the peak corresponding to the EAP (which occurs at tap 1024), the expected signal has several aliased terms (additional peaks). In some embodiments, the mask may be broad enough to include one or more of these aliased terms, in which case peaks in the mask corresponding to aliased terms would cancel out aliased terms in the CER. Storing such a broad mask, however, can require higher amounts of memory. Thus, some embodiments may utilize a mask that is not broad enough to include aliased terms. In such embodiments, alternative methods of alias term cancelation may be used.

One technique of alias term cancelation includes determining an expected aliased term, and adjusting the noise threshold based on the determined expected alias term. For instance, FIG. 4 shows expected aliased terms occurring periodically in the scatter plot (with a period of around 341 taps), prior to the peak corresponding to the EAP. Thus, referring again to FIG. 5, once the mask is positioned and scaled at block S508 to match the peak in the CER identified at block S506, the noise threshold can be adjusted to cancel out these aliased terms. The location and magnitude of the adjustment(s) in the noise threshold can correspond with the expected aliased terms. For example, where the scatter plot in FIG. 4 corresponds with the expected signal, the noise threshold would be periodically adjusted (elevated) prior to the identified peak, with a period of 341 taps. The magnitude of the adjustment would correspond to the magnitude of the aliased terms in FIG. 4. Thus, rather than storing a large mask for alias term cancelation, such cancelation can be made by adjusting the noise threshold on the fly.

One way of implementing such an adjustment would be to start from the beginning of the CER vector and analyzing the each tap. If a non-zero tap is smaller than the tap that is one alias period farther, it is zeroed out. More specifically, $$x[i] = \begin{cases} 0, & x[i] < x[i+T_{alias}] * Th' \\ x[i], & \text{else} \end{cases} \quad (2)$$

Where $T_{alias}$ is the location or periodicity of the determined alias, and threshold $Th'>1$ amplifies the $x[i+T_{alias}]$ element to make sure that an alias term does not escape the rejection due to high noise variance. Even so, this term is still small enough to ensure that a purely noise term in $x[i+T_{alias}]$ does not cause zeroing out of $x[i]$. Other embodiments may utilize additional or alternative techniques for adjusting the noise threshold for alias term cancelation.

Figure 6:
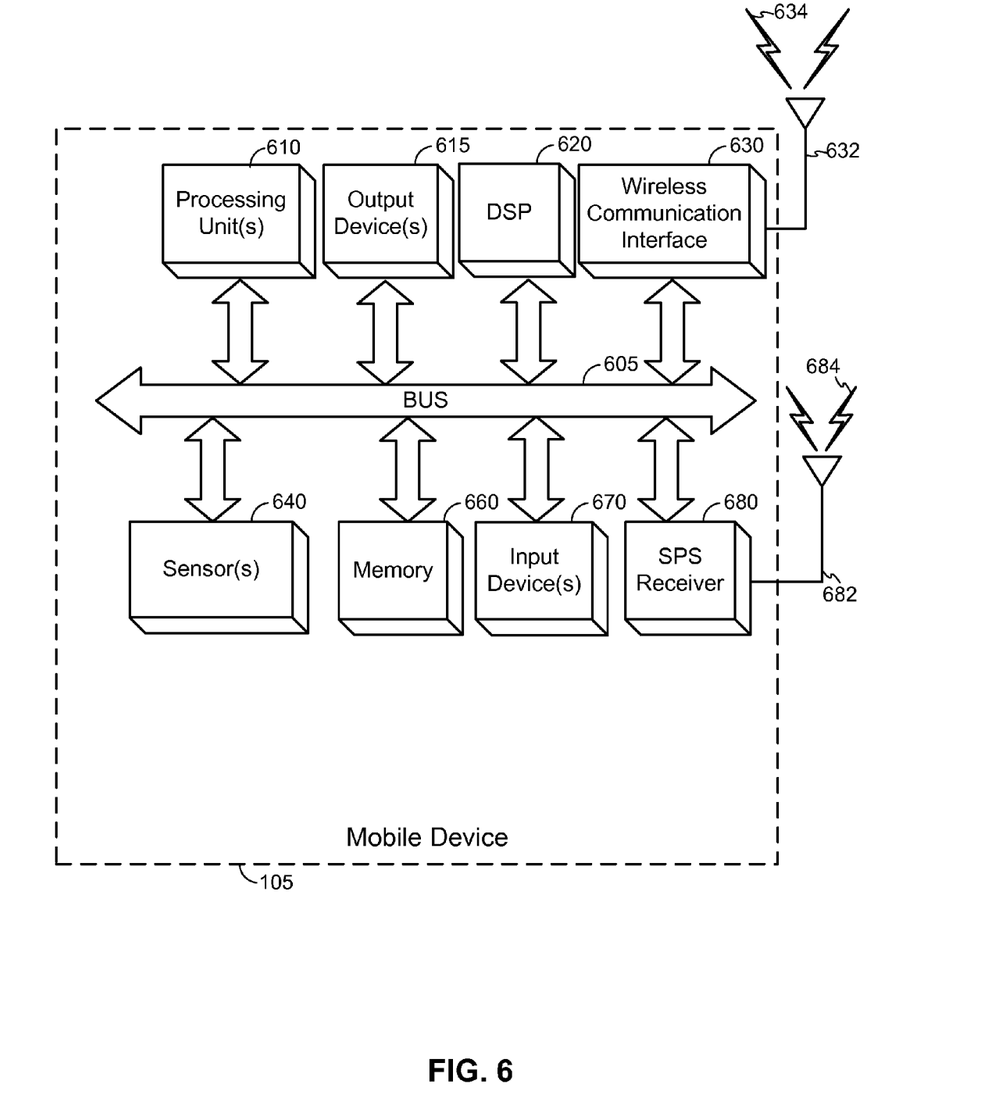
FIG. 6 is a block diagram of an embodiment of a mobile device, capable of implementing methods for determining EAP described herein.

Means for performing the functionality of S508 can include hardware and/or software components of a mobile device, such as the processing unit(s) 610, wireless communication interface 630, bus 605, memory 660, and/or other components of the mobile device 105 illustrated in FIG. 6.

At block 510, it is determined whether there is an earlier peak in the channel energy response which are above the mask and noise threshold. In FIG. 2, as explained previously, the earlier peaks correspond to peaks to the left of peak 212. And although peak 232 was the only earlier peak above the mask and noise threshold in the example of FIG. 2, there may be multiple peaks that are above both the mask and the noise threshold.

If an earlier peak is identified, then the position and scaling of S508 is repeated for the earliest peak above the noise and mask thresholds, illustrating the iterative process of identifying peaks and reapplying the mask to the identified peaks. In the example illustrated in FIGS. 2-3, the first iteration of S508 may be seen in FIG. 3, where the mask 223 is positioned for peak 232, which was above mask 221 in FIG. 2. Because none of the remaining peaks are above mask 223, the process only repeats one time. It can be noted that, although embodiments described herein select the earliest peak where multiple peaks are identified as being above both the mask and noise threshold, alternative embodiments may employ other algorithms for choosing the peak for repositioning and scaling the mask (e.g., the next-earliest peak, the next-highest peak, the peak that rises above the mask the most, etc.). Means for performing the functionality of S510 can include hardware and/or software components of a mobile device, such as the processing unit(s) 610, wireless communication interface 630, bus 605, memory 660, and/or other components of the mobile device 105 illustrated in FIG. 6.

At block S512, once no earlier peaks are above the noise threshold and the most recently-applied mask, the final peak to which the mask was applied (i.e. the earliest peak that was both above the mask and noise thresholds) is selected as the early arrival path for this channel energy response. In cases in which there are no earlier peaks found in S510, the peak identified at S506 (e.g., the highest overall peak) is selected as the early arrival path. Means for performing the functionality of S512 can include hardware and/or software components of a mobile device, such as the processing unit(s) 610, wireless communication interface 630, bus 605, memory 660, and/or other components of the mobile device 105 illustrated in FIG. 6.

Optionally, at block S514, it is determined whether a predetermined number of CERs has been analyzed over a predetermined time period. Block S514 illustrates how the functions of S500-S512 can be repeated for additional CERs over a predetermined time period, thereby helping ensure accuracy in identifying the EAP. The predetermined number of CERs captured for determining EAP, as well as the predetermined time period, may vary depending on desired functionality and/or governing standards. These additional CERs may be collected periodically, based on triggering events, based on a schedule, and the like.

At block S516, where multiple EAPs were identified through multiple repetitions of the functions of S500-S512, an overall EAP is selected. This may be done using the median early arrival path for the plurality of CERs, or using any other similar statistical analysis of the multiple EAP determinations to identify an overall early arrival path and to avoid noise or other causes of outliers that may impact the early arrival path determination. Means for performing the functionality of S514 and S516 can include hardware and/or software components of a mobile device, such as the processing unit(s) 610, wireless communication interface 630, antenna 632, bus 605, memory 660, and/or other components of the mobile device 105 illustrated in FIG. 6.

FIG. 6 illustrates an embodiment of a mobile device 105, which can be utilized as described herein above. For example, the mobile device 105 can be used in the WWAN 100 of FIG. 1 and/or to provide data or perform other functions as described in relation to FIGS. 1-5 and 7. It should be noted that FIG. 5 is meant only to provide a generalized illustration of various components, any or all of which may be utilized as appropriate. It can be noted that, in some instances, components illustrated by FIG. 6 can be localized to a single physical device and/or distributed among various networked devices, which may be disposed at different physical locations. It can further noted that one or more functions described in relation to FIGS. 1-5 and 7 may additionally or alternatively be performed by a computing device having means similar to those of the mobile device shown in FIG. 6.

The mobile device 105 is shown comprising hardware elements that can be electrically coupled via a bus 605 (or may otherwise be in communication, as appropriate). The hardware elements may include a processing unit(s) 610 which can include without limitation one or more general-purpose processors, one or more special-purpose processors (such as digital signal processing (DSP) chips, graphics acceleration processors, application specific integrated circuits (ASICs), and/or the like), and/or other processing structure or means, which can be configured to perform one or more of the methods described herein. As shown in FIG. 6, some embodiments may have a separate DSP 620, depending on desired functionality. The mobile device 105 also can include one or more input devices 670, which can include without limitation a touch screen, a touch pad, microphone, button(s), dial(s), switch(es), and/or the like; and one or more output devices 615, which can include without limitation a display, light emitting diode (LED), speakers, and/or the like.

The mobile device 105 might also include a wireless communication interface 630, which can include without limitation a modem, a network card, an infrared communication device, a wireless communication device, and/or a chipset (such as a Bluetooth™ device, an IEEE 802.11 device, an IEEE 802.15.4 device, a WiFi device, a WiMax device, cellular communication facilities, etc.), and/or the like. The wireless communication interface 630 may permit data (such as location information, as described in the embodiments herein) to be communicated with a network, wireless access points, base stations, other computer systems, and/or any other electronic devices described herein, such as the wireless network 140, Internet 150, location server 160, and/or other networks or devices. The communication can be carried out via one or more wireless communication antenna(s) 632 that send and/or receive wireless signals 634. Furthermore, the wireless communication interface 630 may provide the means by which the mobile device 105 obtains the CER, as described in embodiments herein.

Depending on desired functionality, the wireless communication interface 630 can include separate transceivers to communicate with base transceiver stations (e.g., antennas 120) and other wireless devices and access points. As indicated previously with respect to FIG. 1, these different data networks can include various network types. For example, a WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may employ LTE, LTE Advanced, and so on. LTE, LTE Advanced, GSM, and W-CDMA are described in documents from 3GPP. Cdma2000 is described in documents from a consortium named "3rd Generation Partnership Project 2" (3GPP2). 3GPP and 3GPP2 documents are publicly available. A WWAN may also comprise a wireless local area network (WLAN), such as an IEEE 802.11x network, and a wireless personal area network (WPAN), such as a Bluetooth network, an IEEE 802.15x, or some other type of network. The techniques described herein may also be used for any combination of WWAN, WLAN and/or WPAN.

The mobile device 105 can further include sensor(s) 640. Such sensors can include, without limitation, one or more accelerometer(s), gyroscope(s), camera(s), magnetometer(s), altimeter(s), microphone(s), proximity sensor(s), light sensor(s), and the like. Some or all of the sensor(s) 640 can be utilized for positioning methods, which can be used in addition or as an alternative to the positioning methods described herein.

As previously discussed, embodiments of the mobile device 105 may also include an SPS receiver 680 capable of receiving signals 684 from one or more SPS satellites using an SPS antenna 682. Such positioning can be utilized to complement and/or incorporate the techniques described herein. The SPS receiver 680 can extract a position of the mobile device 105, using conventional techniques. SPS systems can include, for example a Global Navigation Satellite System (GNSS) (e.g., Global Positioning System (GPS), Galileo, Glonass, Compass, Quasi-Zenith Satellite System (QZSS) over Japan, Indian Regional Navigational Satellite System (IRNSS) over India, Beidou over China, and/or the like). Moreover, the SPS receiver 680 can be used various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

The mobile device 105 may further include and/or be in communication with a memory 660. The memory 660 can include, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The memory 660 of the mobile device 105 also can comprise software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the functionality discussed above might be implemented as code and/or instructions executable by the mobile device 105 (and/or a processing unit within a mobile device 105) (and/or another device of a positioning system). In an aspect, then, such code and/or instructions can be used to configure and/or adapt a general purpose computer (or other device) to perform one or more operations in accordance with the described methods.

Figure 7:
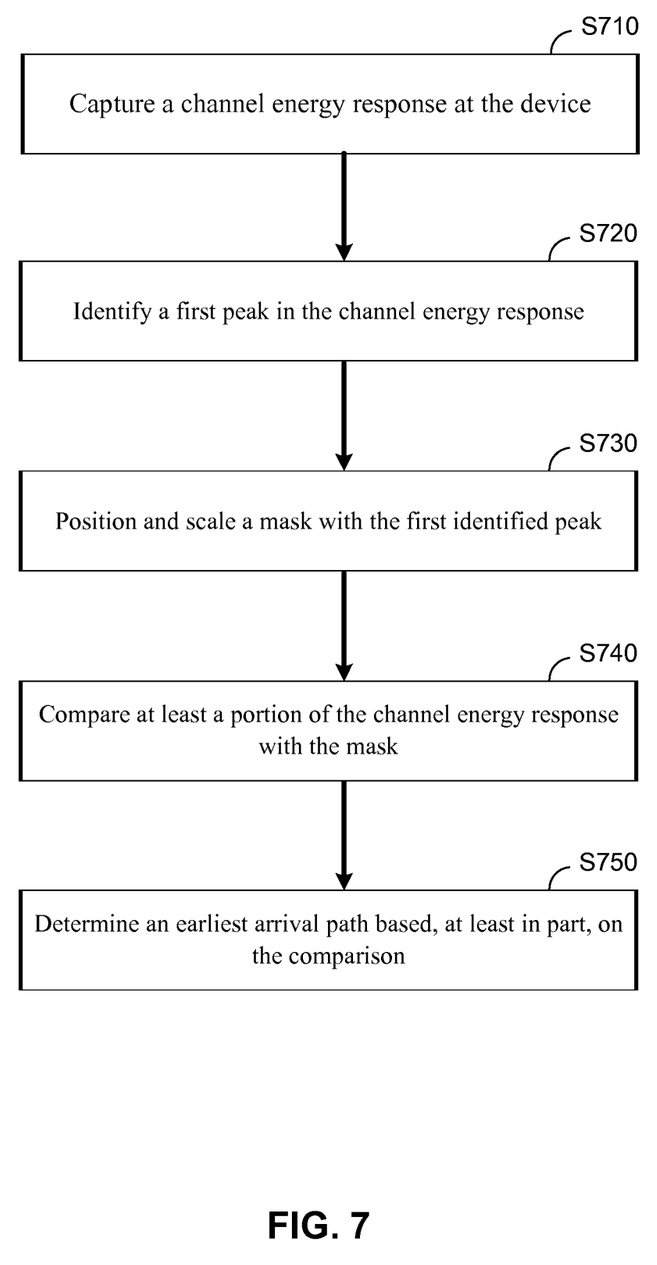
FIG. 7 is flow diagram that illustrates another method for determining an EAP for a device, according to one embodiment.

FIG. 7 is flow diagram that illustrates another method for determining an EAP for a device, according to one embodiment. It can be noted that the method described in relation to FIG. 7 may include one or more components of the method described in relation to FIG. 5. The method of claim 7, however, includes a more basic method of EAP determination. Means for performing one or more of the functions of the blocks shown can include one or more hardware and/or software components of a mobile device, such as the one described below in reference to FIG. 6.

At block S710, a channel energy response is captured at the device. Here, the "device" can mean a mobile device, such as the mobile device 105 of FIGS. 1 and 6. That said, embodiments may include CER capture and/or EAP determination by another device. Means for performing the functionality of S710 can include hardware and/or software components of a mobile device, such as the processing unit(s) 610, wireless communication interface 630, antenna 632, bus 605, memory 660, and/or other components of the mobile device 105 illustrated in FIG. 6.

At block S720 a first peak in the channel energy response is identified. Here, the first identified is an initially-identified maximum value of a first portion of the CER. Thus, there may be other peaks that precede the first identified peak in the CER. As explained in other embodiments herein, a noise threshold may also be identified, which can be based on an identified noise floor. In such embodiments, identifying peaks in the CER can further include not only a comparison of the CER with the mask, but also a determination that any peaks in the CER that rise above the mask also rise above the noise threshold. Means for performing the functionality of S720 can include hardware and/or software components of a mobile device, such as the processing unit(s) 610, wireless communication interface 630, bus 605, memory 660, and/or other components of the mobile device 105 illustrated in FIG. 6.

At block S730 a mask is positioned and scaled with the first identified peak. As discussed in previously-described embodiments the positioning of the mask can mean centering a peak of the mask with the first identified peak, and the scaling of the mask can mean placing the peak value of the peak of the mask with the peak value of the first identified peak. Alternative embodiments may position and/or scale the mask in alternative ways. Furthermore, the mask may be selected from one of a plurality of masks. Such mask selection may be based on one or more characteristics of the CER, such as the power lever at a certain portion of the CER (such as the slope prior to the first identified peak). As explained elsewhere herein, the mask can be derived from the auto-correlation function of at least one signal. The signal can be an expected signal, such as a positioning reference signal (PRS) of the LTE standard. Means for performing the functionality of S730 can include hardware and/or software components of a mobile device, such as the processing unit(s) 610, wireless communication interface 630, bus 605, memory 660, and/or other components of the mobile device 105 illustrated in FIG. 6.

At block S740, at least a portion of the channel energy response is compared with the mask. As previously discussed, the mask may be used to identify additional peaks that occur in the CER prior to the "first peak." Accordingly, portions of the CER that occur prior to the first identified peak may be compared with the mask to determine whether there are additional peaks in the CER that rise above the mask. Means for performing the functionality of S740 can include hardware and/or software components of a mobile device, such as the processing unit(s) 610, wireless communication interface 630, bus 605, memory 660, and/or other components of the mobile device 105 illustrated in FIG. 6.

At block S750, the earliest arrival path is determined, based, at least in part, on the comparison. As discussed earlier, the comparison may reveal one or more peaks in the CER that rise above the mask. In such instances, the following process can be repeated iteratively until the EAP is found:

A next peak may be identified, where the next identified peak is a maximum value of a next portion of the CER, where the next peak occurs at an earlier time than an earlier identified peak. The mask is then positioned and scaled with the next identified peak, and the determination of the earliest arrival path is further based on the comparison of the at least the portion of the CER with the mask as positioned and scaled with the next identified peak.

As indicated herein, this process may occur iteratively until the EAP is found. In other words, the process is repeated until no additional peaks rise above the mask as positioned and scaled with the most recently-identified peak. In the first instance, the "next peak" would be a second identified peak, where the "earlier identified peak" is the first identified peak. In some instances, the second identified peak may be the EAP. In other instances, the process above may be repeated several times, such that the EAP is the third, fourth, fifth, etc. identified peak. Means for performing the functionality of S750 can include hardware and/or software components of a mobile device, such as the processing unit(s) 610, wireless communication interface 630, bus 605, memory 660, and/or other components of the mobile device 105 illustrated in FIG. 6.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory (e.g., the memory 660 of the mobile device 105 in FIG. 6) can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, any other physical medium with patterns, a RAM, a PROM, EPROM, a FLASH-EPROM, any other memory chip or cartridge, a carrier wave as described hereinafter, and/or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

What is claimed is:

1. A method of determining an early arrival path of a wireless signal at a device comprising:
   capturing a channel energy response at the device;
   identifying a first peak in the channel energy response, the first identified peak comprising a maximum value of a first portion of the channel energy response;
   positioning and scaling a mask with the first identified peak;
   comparing at least a portion of the channel energy response with the mask as positioned and scaled with the first identified peak; and
   determining an earliest arrival path based, at least in part, on the comparison of the at least the portion of the channel energy response with the mask as positioned and scaled with the first identified peak.

2. The method of claim 1, further comprising:
   (i) identifying, based on the comparison of the at least the portion of the channel energy response with the mask, a next peak, the next identified peak comprising a maximum value of a next portion of the channel energy response, wherein the next identified peak occurs at an earlier time than an earlier identified peak and rises above the mask as positioned and scaled with the earlier identified peak;

(ii) positioning and scaling the mask with the next identified peak; and (iii) comparing at least a portion of the channel energy response with the mask as positioned and scaled with the next identified peak;

wherein determining the earliest arrival path is further based on the comparison of the at least the portion of the channel energy response with the mask as positioned and scaled with the next identified peak.

3. The method of claim 2, wherein the earlier identified peak is the first identified peak.

4. The method of claim 2, further comprising repeating (i), (ii), and (iii) until no additional peaks rise above the mask as positioned and scaled with a most recently-identified peak.

5. The method of claim 1, further comprising:
identifying a noise threshold; and
comparing at least a portion of the channel energy response with the noise threshold;
wherein determining the earliest arrival path is further based on the comparison of the at least the portion of the channel energy response with the noise threshold.

6. The method of claim 5, further comprising:
determining an expected aliased term; and
adjusting at least a portion of the noise threshold based on the determined expected alias term.

7. The method of claim 1, further comprising selecting the mask from a plurality of masks based on one or more characteristics of the channel energy response.

8. The method of claim 7, wherein the one or more characteristics of the channel energy response includes a power level of a portion of the channel energy response.

9. The method of claim 1, wherein the mask is derived from an auto-correlation function of at least one signal.

10. A mobile device comprising:
a memory;
a wireless communication interface configured to capture a channel energy response; and
a processing unit communicatively coupled to the memory and the wireless communication interface and configured to:
identify a first peak in the channel energy response, the first identified peak comprising a maximum value of a first portion of the channel energy response;
position and scale a mask with the first identified peak;
compare at least a portion of the channel energy response with the mask as positioned and scaled with the first identified peak; and
determine an earliest arrival path based, at least in part, on the comparison of the at least the portion of the channel energy response with the mask as positioned and scaled with the first identified peak.

11. The mobile device of claim 10, wherein the processing unit is further configured to:
(i) identify, based on the comparison of the at least the portion of the channel energy response with the mask, a next peak, wherein the next identified peak comprises a maximum value of a next portion of the channel energy response and occurs at an earlier time than an earlier identified peak and rises above the mask as positioned and scaled with the earlier identified peak;
(ii) position and scale the mask with the next identified peak; and (iii) compare at least a portion of the channel energy response with the mask as positioned and scaled with the next identified peak;

wherein determining the earliest arrival path is further based on the comparison of the at least the portion of the channel energy response with the mask as positioned and scaled with the next identified peak.

12. The mobile device of claim 11, wherein the processing unit is further configured to repeat (i), (ii), and (iii) until no additional peaks rise above the mask as positioned and scaled with a most recently-identified peak.

13. The mobile device of claim 10, wherein the processing unit is further configured to:
identify a noise threshold; and
compare at least a portion of the channel energy response with the noise threshold;
wherein determining the earliest arrival path is further based on the comparison of the at least the portion of the channel energy response with the noise threshold.

14. The mobile device of claim 13, wherein the processing unit is further configured to:
determine an expected aliased term; and
adjust at least a portion of the noise threshold based on the determined expected alias term.

15. The mobile device of claim 10, wherein the processing unit is further configured to select the mask from a plurality of masks based on one or more characteristics of the channel energy response.

16. The mobile device of claim 15, wherein the one or more characteristics of the channel energy response includes a power level of a portion of the channel energy response.

17. An apparatus comprising:
means for capturing a channel energy response;
means for identifying a first peak in the channel energy response, the first identified peak comprising a maximum value of a first portion of the channel energy response;
means for positioning and scaling a mask with the first identified peak;
means for comparing at least a portion of the channel energy response with the mask as positioned and scaled with the first identified peak; and
means for determining an earliest arrival path based, at least in part, on the comparison of the at least the portion of the channel energy response with the mask as positioned and scaled with the first identified peak.

18. The apparatus of claim 17, further comprising means for:
(i) identifying, based on the comparison of the at least the portion of the channel energy response with the mask, a next peak, the next identified peak comprising a maximum value of a next portion of the channel energy response, wherein the next identified peak occurs at an earlier time than an earlier identified peak and rises above the mask as positioned and scaled with the earlier identified peak;
(ii) positioning and scaling the mask with the next identified peak; and
(iii) comparing at least a portion of the channel energy response with the mask as positioned and scaled with the next identified peak;
wherein determining the earliest arrival path is further based on the comparison of the at least the portion of the channel energy response with the mask as positioned and scaled with the next identified peak.

19. The apparatus of claim 18, wherein the means for performing (i), (ii), and (iii) are configured to repeat (i), (ii), and (iii) until no additional peaks rise above the mask as positioned and scaled with a most recently-identified peak.

20. The apparatus of claim 17, further comprising:
means for identifying a noise threshold; and
means for comparing at least a portion of the channel energy response with the noise threshold;
wherein determining the earliest arrival path is further based on the comparison of the at least the portion of the channel energy response with the noise threshold.

* * * * *